(12) United States Patent
Pritchard

(10) Patent No.: US 7,789,269 B2
(45) Date of Patent: Sep. 7, 2010

(54) VOLUMETRIC DISPENSING FITMENT WITH BARRIERS AND PACKAGE INCLUDING THE SAME

(75) Inventor: Barry Pritchard, Nazareth, PA (US)

(73) Assignee: Fres-co System USA, Inc., Telford, PA (US)

(*) Notice: Subject to any disclaimer, the term of this patent is extended or adjusted under 35 U.S.C. 154(b) by 0 days.

(21) Appl. No.: 12/763,398

(22) Filed: Apr. 20, 2010

(65) Prior Publication Data

US 2010/0200611 A1 Aug. 12, 2010

Related U.S. Application Data

(62) Division of application No. 11/609,064, filed on Dec. 11, 2006, now Pat. No. 7,708,164.

(60) Provisional application No. 60/864,424, filed on Nov. 6, 2006.

(51) Int. Cl.
*B67D 1/00* (2006.01)

(52) U.S. Cl. ............................... 222/81; 222/82; 222/83; 222/88; 222/92; 222/207; 222/212; 222/541.2; 222/541.9

(58) Field of Classification Search ............. 222/80–83, 222/86–88, 92, 95, 105, 153.06, 631–633, 222/206–207, 209, 541.2, 212–215, 380, 222/383.1, 518, 444, 448, 541.9, 183, 506, 222/509; 137/512

See application file for complete search history.

(56) References Cited

U.S. PATENT DOCUMENTS

| | | | | |
|---|---|---|---|---|
| 2,081,253 A | * | 5/1937 | Serre | 222/207 |
| 2,772,817 A | * | 12/1956 | Jauch | 222/207 |
| 3,141,580 A | * | 7/1964 | Rogers | 222/213 |
| 3,220,611 A | * | 11/1965 | Zander et al. | 222/95 |
| 3,696,969 A | * | 10/1972 | De Van et al. | 222/105 |
| 4,314,654 A | * | 2/1982 | Gaubert | 222/83 |
| 4,416,395 A | * | 11/1983 | Gaubert | 222/83 |
| 4,429,810 A | * | 2/1984 | Hampel et al. | 222/107 |
| 4,440,316 A | * | 4/1984 | Christine | 222/83.5 |
| 4,452,378 A | * | 6/1984 | Christine | 222/107 |
| 4,469,249 A | * | 9/1984 | Malpas et al. | 222/83 |
| 4,475,566 A | * | 10/1984 | Haines | 137/68.3 |
| 4,576,313 A | * | 3/1986 | Smith et al. | 222/81 |

(Continued)

FOREIGN PATENT DOCUMENTS

WO   WO 2006097704 A1  *  9/2006

*Primary Examiner*—Frederick C. Nicolas
(74) *Attorney, Agent, or Firm*—Caesar, Rivise, Bernstein, Cohen & Pokotilow, Ltd.

(57) ABSTRACT

A fitment for package holding a liquid and a package including such a fitment. The fitment is a metering dispensing valve arranged to be secured to a flexible bag for selectively dispensing a metered quantity of the liquid therefrom. It includes a compressible bulb and a piercing member which when actuated pierces through the bag to enable a metered amount of the liquid to be drawn into a reservoir in the bulb. The bulb can then be compressed to dispense the metered amount of liquid from the reservoir. The dispensing valve also includes a inlet valve to the reservoir and an outlet valve from the reservoir. The fitment may include a pair of barriers to enable it to be sterilized before being secured to the bag form an aseptic package.

12 Claims, 3 Drawing Sheets

U.S. PATENT DOCUMENTS

| | | | | |
|---|---|---|---|---|
| 4,602,725 | A | * | 7/1986 | Malpas et al. ............... 222/83.5 |
| 4,696,415 | A | * | 9/1987 | Meshberg ..................... 222/82 |
| 4,828,150 | A | * | 5/1989 | Bottger et al. .............. 222/207 |
| 4,961,508 | A | * | 10/1990 | Weimer et al. ............... 222/214 |
| 5,337,775 | A | * | 8/1994 | Lane et al. ............... 137/68.29 |
| 5,697,525 | A | * | 12/1997 | O'Reilly et al. ............. 222/105 |
| 5,730,327 | A | * | 3/1998 | Stern ........................... 222/82 |
| 5,810,203 | A | * | 9/1998 | Brennan ..................... 222/207 |
| 5,819,989 | A | * | 10/1998 | Saraceni ..................... 222/192 |
| 5,875,936 | A | * | 3/1999 | Turbett et al. ................ 222/207 |
| 6,082,584 | A | * | 7/2000 | Stern ........................... 222/83 |
| 6,131,767 | A | * | 10/2000 | Savage et al. .................. 222/1 |
| 6,446,845 | B1 | * | 9/2002 | Steiger ....................... 222/509 |
| 6,547,106 | B2 | * | 4/2003 | Bonningue .................. 222/213 |
| 7,708,164 | B2 | * | 5/2010 | Pritchard ..................... 222/81 |
| 2005/0121464 | A1 | * | 6/2005 | Miller et al. .................. 222/81 |
| 2006/0065677 | A1 | * | 3/2006 | Py et al. ................... 222/383.1 |
| 2008/0245816 | A1 | * | 10/2008 | Armstrong et al. ............ 222/81 |

\* cited by examiner

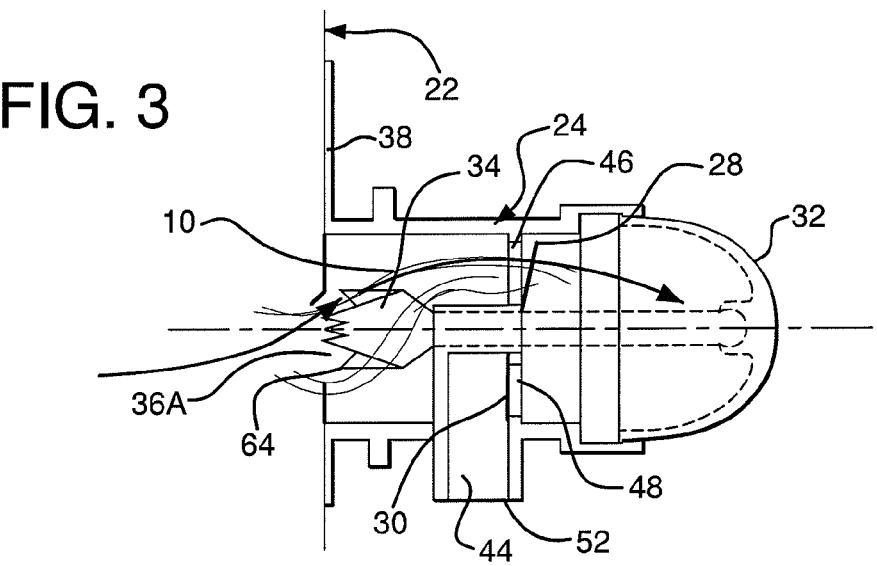
FIG. 3
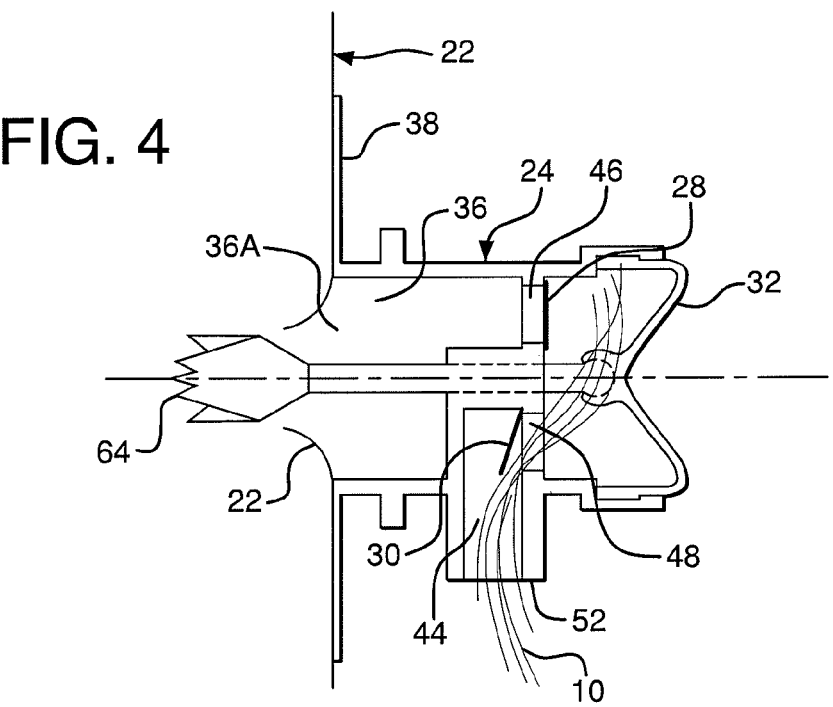
FIG. 4
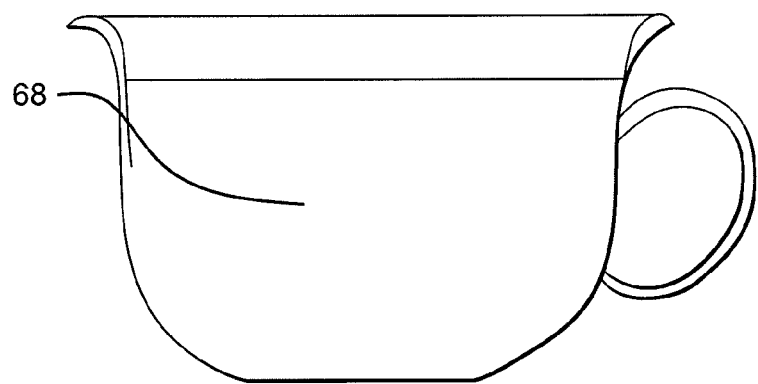

VOLUMETRIC DISPENSING FITMENT WITH BARRIERS AND PACKAGE INCLUDING THE SAME

CROSS REFERENCE TO RELATED APPLICATIONS

This divisional application claims the benefit under 35 U.S.C. §121 of application Ser. No. 11/609,064, filed on Dec. 11, 2006, which in turn claims the benefit under 35 U.S.C. §119(e) of Provisional Patent Application No. 60/864,424, filed on Nov. 6, 2006, the contents all of which are incorporated herein by reference.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK
"Not Applicable"

SPECIFICATION

Background of the Invention

1. Field of Invention

This invention relates generally to flexible packages and more particularly to flexible packages including a fitment for dispensing a metered amount of liquid within the packages.

2. Description of Related Art

Numerous patents disclose flexible packing for holding liquids and for dispensing the liquid through a fitment outlet or tap forming a portion of the package. For example, U.S. Pat. Nos. 4,429,810 (Hample et al.), 3,696,969 (DeVan et al.), 4,314,654 (Gaubert), 4,416,395 (Gaubert), 4,452,378 (Christine), 4,602,725 (Malpas et al.), 6,131,767 (Savage et al.), 6,446,845 (Steiger) and published application 2005/0121464A1.

The devices of the above identified prior art make use of gravity to enable the liquid within the flexible package to be dispensed from the package. As will be appreciated by those skilled in the art, when the contents of the flexible package has reached a very low level there may not be sufficient static head to enable the dispensing of further amounts, thereby leaving some liquid still within the package. Moreover, the dispensing packages of the prior art making use of gravity as the mechanism for effecting the dispensing operation may not provide precise and repeatable metering of the liquid being dispensed.

Flexible packages for use with pumps also exist in the prior art. See for example, Letters Patent Nos. 4,576,313 (Smith et al.), 5,819,986 (Last et al.) and 6,082,584 (Stern).

While the aforementioned packages with fitments may be generally suitable for their intended purposes, they suffer from one or more of the drawbacks, e.g., simplicity of construction, low cost, effectiveness in dispensing repeated metered amounts of liquid, and effectiveness dispensing the entire contents of the package. The subject invention addresses the needs of the prior art.

BRIEF SUMMARY OF THE INVENTION

This invention relates to a fitment for a package holding a liquid therein and a package including such a fitment. The fitment is arranged for selectively dispensing a metered quantity of the liquid from the package. The package comprises a flexible bag having a wall. The fitment is in the form of a metering valve. The metering valve has a body, a fluid inlet check valve, a fluid outlet check valve, a compressible bulb, a piercing element and an outlet. The compressible bulb defines a collapsible reservoir into which a portion of the liquid from the bag can be transferred for dispensing. The inlet valve is arranged to isolate the reservoir from the bag. The outlet valve is arranged to isolate the reservoir from the outlet.

The piercing element is coupled to the compressible bulb, whereupon when the bulb is compressed it causes the piercing element to pierce through a portion of the wall of the bag. The valve is arranged when the bulb is released thereafter for automatically opening the inlet valve and closing the outlet valve, whereupon a metered amount of the liquid is drawn into the reservoir. The metering valve is further arranged so that when the bulb is compressed after the liquid is drawn into the reservoir the outlet valve is automatically opened to dispense a metered amount of the liquid through the outlet.

In accordance with another aspect of this invention the fitment is a sterilized member arranged to form an aseptic package. In this aspect of the invention the fitment additionally comprises an inlet barrier and an outlet barrier. The inlet bather is initially disposed over the inlet and the outlet barrier is initially disposed over the outlet, whereupon the interior of the fitment is initially sealed and isolated from the ambient atmosphere so that it can be exposed to ionizing radiation to render its internal surfaces sterile. The fitment is then secured to the wall of the bag to complete the aseptic package. The outlet barrier is arranged to be removed from the outlet. In use, the piercing member pierces both the inlet barrier and the portion of the wall of the bag so that the material within the bag can gain ingress into the interior of the fitment for dispensing therefrom as described above.

BRIEF DESCRIPTION OF SEVERAL VIEWS OF THE DRAWINGS

The invention will be described in conjunction with the following drawings in which like reference numerals designate like elements and wherein:

FIG. 3 is a view similar to FIG. 1 and, but showing the valve during a subsequent step in its use;

FIG. 4 is a view similar to FIGS. 1-3 showing the valve at a still later step in its use, i.e., when the liquid within the flexible package is dispensed out of the package.

DETAILED DESCRIPTION OF THE INVENTION

Figure 1:
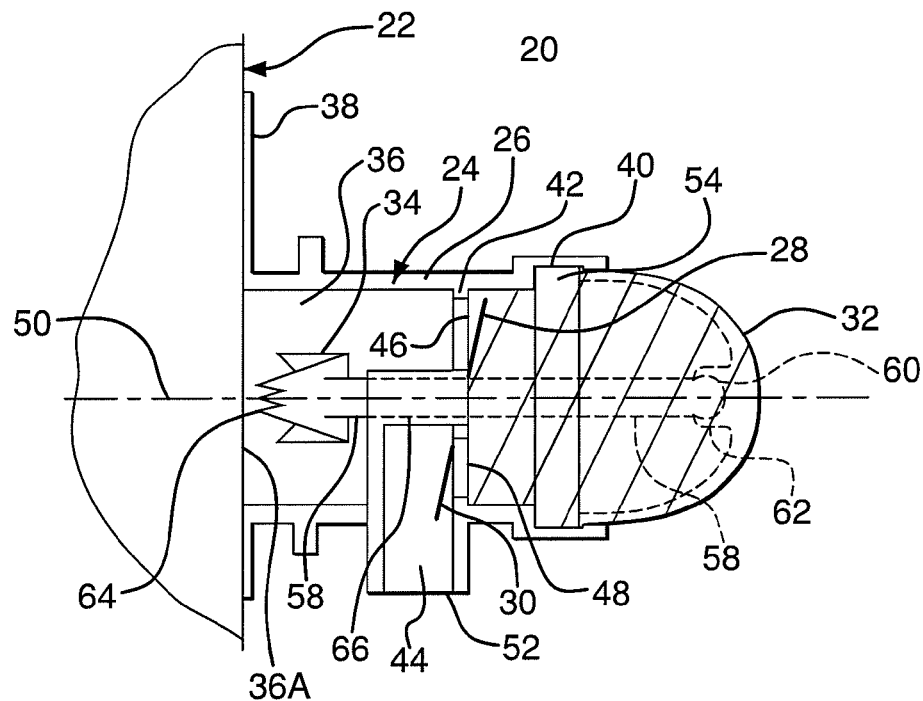
FIG. 1 is a sectional view of a portion of a flexible package having a fitment in the form of a dispensing valve constructed in accordance with this invention secured thereto and showing the valve before its first use.

In FIG. 1 there is shown at one exemplary embodiment of a disposable package 20 for holding and dispensing a liquid 10, e.g., coffee creamer. The package 20 is in the form of a flexible bag or pouch 22 having a fitment 24 secured thereto. The fitment 24 is constructed in accordance with this invention and serves as a metering dispensing valve for metering a predetermined quantity of the liquid 10 into it and for dispensing that metered quantity of liquid out of it when desired. The flexible package can be of any conventional construction, e.g., formed of a polymeric film of one or more layers.

The fitment (dispensing valve) 24 basically comprises a body 26, a fluid inlet check valve 28, a fluid outlet check valve 30, a compressible bulb 32 and a piercing element 34. The valve body 26 includes a hollow cylindrical section 36 having a peripheral flange 38 at one end thereof, an annular undercut recess 40 at its opposite end, a central wall 42 and a spout 44. The peripheral flange 38 is arranged to be fixedly secured, e.g., welded, to the wall of the bag 22 in which the liquid 10 to be dispensed is located. The end of the hollow cylindrical section is open to form the inlet 36A to the fitment 24. The central wall 42 includes an inlet opening 46 and an outlet opening 48. The inlet opening 46 is in fluid communication with the hollow interior of the valve body 26. The outlet opening 48 is in fluid communication with the hollow interior of the spout 44. The spout 44 extends generally perpendicularly to the longitudinal central axis 50 of the valve body 26 and is open at its free end to form the outlet 52 of the fitment 24.

The compressible bulb 32 comprises a resilient, e.g., rubber, member, which together with the associated portion of the valve body 26 forms a collapsible chamber or reservoir into which a metered amount of liquid 10 from the bag 22 is transferred for subsequent dispensing. In the exemplary embodiment shown the compressible bulb 32 is of generally hemispheric shape having an annular peripheral flanged rim 54. The interior of the bulb 32 is hollow so that its inner wall and the contiguous portions of the hollow interior of the valve body 26 form the heretofore mentioned reservoir. The volumetric capacity of that reservoir is a matter of choice, depending upon the liquid to be dispensed. Thus, for application wherein the bag 22 contains a coffee creamer, the reservoir has a capacity of approximately 0.5 oz. since that is a typical amount of creamer used for a cup of coffee. The rim 54 of the bulb 32 is arranged for receipt within the undercut recess 40 of the valve body 26 to secure the bulb to the body.

The fluid outlet check valve 30 is of any suitable construction, e.g., a flap valve, and is mounted within the hollow valve body on the central wall 42 adjacent the outlet opening 48 on the side of the wall closest to the flange 38. This valve is normally closed to isolate the interior of the bulb from the spout 44, except during the dispensing operation (to be described later). The fluid inlet check valve 28, is also of any suitable construction, e.g., a flap valve, and is also mounted within the hollow body on the central wall 42 adjacent the inlet opening 46, but is located on the opposite side of the central wall 42 as the outlet fluid check valve 30. The fluid inlet check valve is normally open so that the hollow interior of the valve body 26 is in fluid communication with the hollow interior of the bulb 32.

The piercing element 34 basically comprises a rod-like plunger 58 having a bulbous free end 60 which is held within a mating socket 62 making up the inner surface of the apex of the bulb 32. The opposite end of the plunger 58 is in the form of plural piercing teeth 64. The plunger 58 extends through a central hole 66 in the central wall 42 of the valve body, which hole serves as a guide to enable the plunger 58 to reciprocate through it along the longitudinal axis 50. The length of the plunger 58 is selected so that when the dispensing valve 20 is in its normally closed state, such as shown in FIG. 1, the piercing teeth 64 of the plunger 58 are spaced from the wall of the flexible bag or pouch 22 onto which the dispensing valve 20 is secured.

Figure 2:
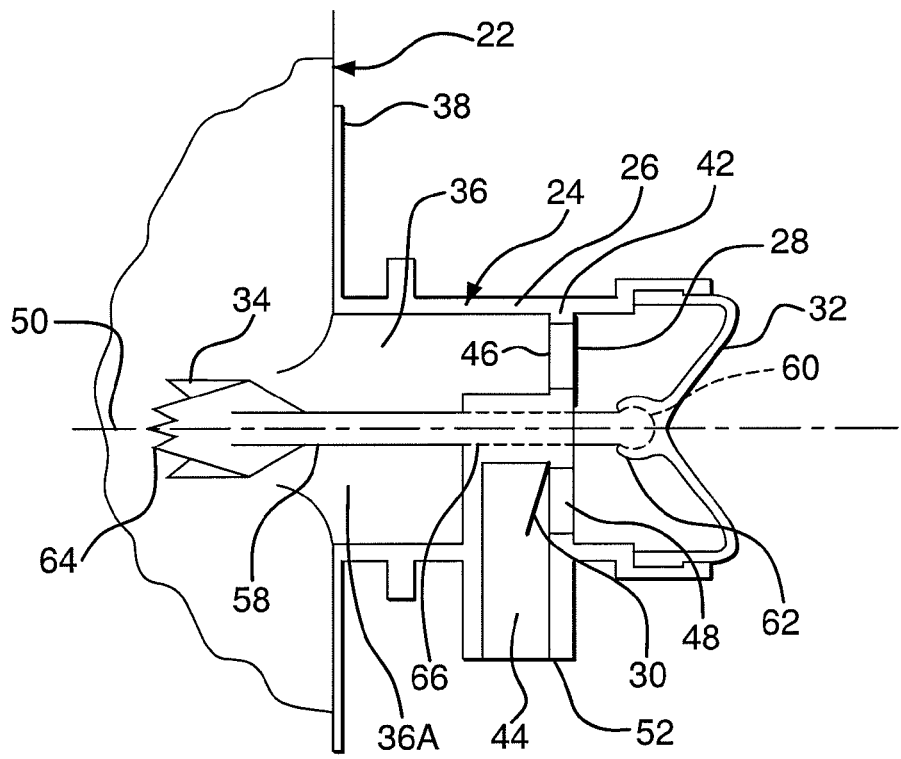
FIG. 2 is a view similar to FIG. 1, but showing the valve during the initial step in its use.

Operation of the dispensing valve 20 will now be described. To that end, when it is desired to dispense a metered amount of the liquid 10, the user merely presses on the distal end of the bulb 32 to compress the bulb. This action causes the plunger 58 to move to the left as shown in FIG. 2, whereupon the teeth 64 of the piercing element penetrate the wall of the bag 22 so that the liquid 10 contents can flow into the hollow interior of the dispensing valve 24. When the bulb 32 is compressed, such as shown in FIG. 2, the flap of the fluid inlet valve 28 is caused to move into engagement with the central wall 42 contiguous with the inlet opening 46, thereby closing off that opening and preventing any liquid 10 from the bag 22 from entering into the hollow interior (reservoir) of the bulb 32. The compression of the bulb 32 also forces the air that was within its reservoir to pass through the outlet opening 48, thereby causing the flap of the fluid outlet valve 30 to move off of the portion of the central wall 42 contiguous with the opening 48 so that the air escapes from the valve through the communicating spout 44.

When the user releases the bulb 32, such as shown in FIG. 3, the natural resiliency of the material making up the bulb, e.g., the rubber, causes it to reassume its normal shape, whereupon the reservoir within it expands. This action creates a vacuum within the reservoir to cause the fluid inlet valve 28 to open and the fluid outlet valve 30 to close. Moreover, the negative pressure on the flap of the fluid outlet valve holds it in the closed position. The opening of the fluid inlet valve 28 coupled with the vacuum created within the bulb's reservoir draws the liquid 10 from the bag 22 into the valve 20 as shown by the arrow in FIG. 3, whereupon the liquid 10 enters and fills the reservoir. Accordingly a metered amount of liquid is now within the reservoir ready to be dispensed, when desired.

To that end, all that is required to dispense the metered amount of liquid is for the user to again depress the bulb 32, like shown in FIG. 4, whereupon pressure on the liquid within the reservoir acts against the flap of outlet valve 30 to cause that valve to open and the liquid to pass through the outlet opening 48 out of the spout 44, e.g., into a cup 68 of coffee located below the spout.

It should be pointed out at this juncture that the size (capacity) and shape of the bulb and its reservoir is a matter of design choice. Thus, the valve of this invention can be constructed to dispense quantities of fluid in amounts other than 0.5 oz.

Figure 5:
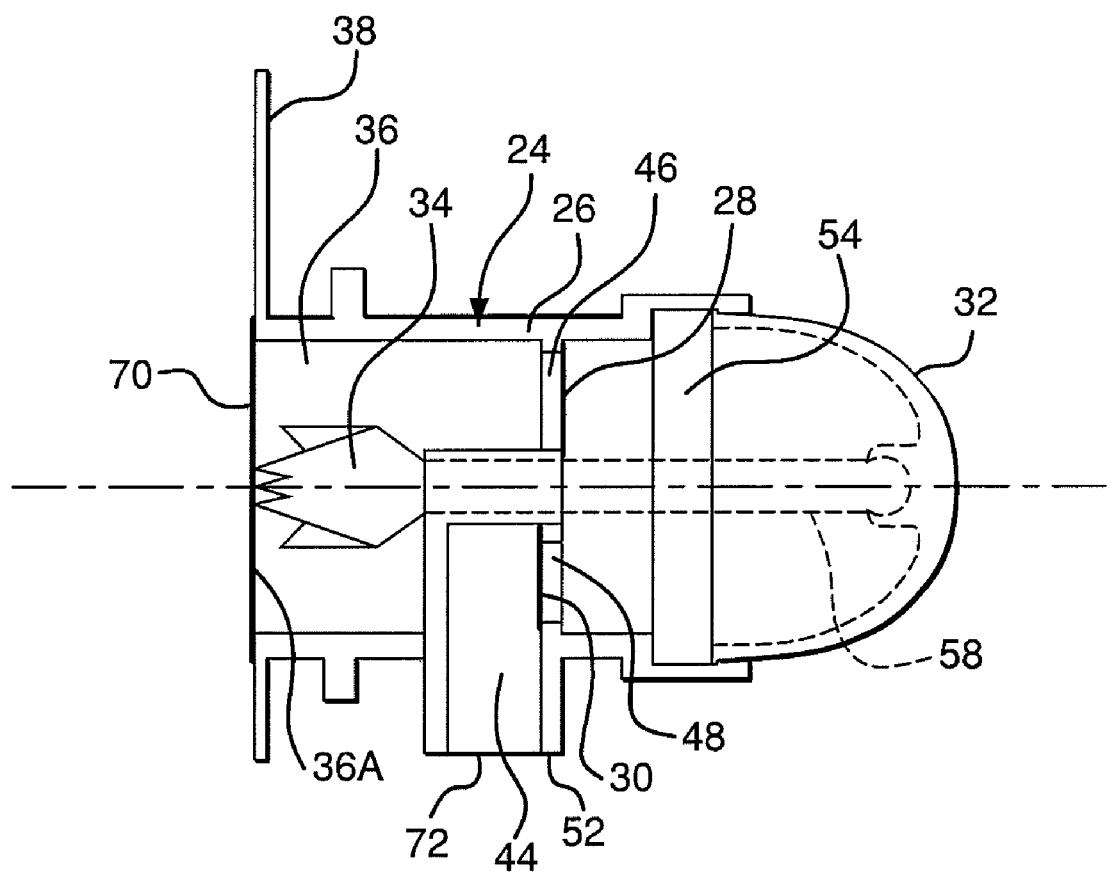
FIG. 5 is a view similar to FIG. 1, but showing an alternative fitment for use in an aseptic flexible package.

In FIG. 5 there is shown an alternative embodiment of a fitment constructed in accordance with this invention. That alternative fitment is identical in construction to fitment 24 except for the addition of an inlet barrier 70 and an outlet barrier 72. Thus, in the interest of brevity the same reference numbers will be given to the common components of the fitments shown in FIGS. 1 and 5 and the details of their construction and operation will not be reiterated. To that end, as can be seen in FIG. 5 the inlet barrier 70 is disposed over the inlet opening 36A of the fitment 24. The inlet barrier 70 basically comprises a thin pierceable membrane formed of any suitable material which is secured about the entire periphery of the inlet to the fitment. The barrier membrane may be heat sealed to the periphery of the inlet or may be molded in place, e.g., molded in-situ with the formation of the body of the fitment. The outlet barrier 72 also constitutes a thin membrane, but is located over the outlet 52 by being releasably secured to the periphery of the outlet. With the inlet and outlet barriers in place, the fitment 24 of FIG. 5 is sealed, i.e., its interior surfaces are isolated from the ambient atmosphere. In this state the fitment can be irradiated, e.g., exposed to ionizing radiation to render all of its internal surfaces sterile. The sterile fitment can then be used in a conventional form, fill and seal machine (not shown) to fixedly secure it to the wall of the bag 22 under aseptic conditions for applications wherein the package will be holding contents requiring an aseptic package, e.g., flowable foodstuffs, etc. To that end, the sterilized fitment when located within the form, fill and seal machine can be subjected to vapor phase $H_2O_2$ to sterilize its exterior surfaces, and in particular the mounting flange 38, whereupon the fitment can then be secured to the wall of the bag or pouch 22. Once filled and sealed in that manner, the resulting package is an aseptic, sterile dispensing package.

Use of the aseptic package using the fitment of FIG. 5 to dispense its contents is accomplished in a similar manner as described above, except that the outlet barrier membrane 72 must be removed to uncover the fitment's outlet 52. Then depression of the bulb 32 can be accomplished, whereupon the sharp teeth 64 of the piercing element 34 will first pierce through the inlet barrier membrane 72 and then through the immediately underlying portion of the wall of the bag or pouch 22, whereupon the contents of the bag or pouch can flow into the fitment and be dispensed therefrom in the same manner as described above.

While the invention has been described in detail and with reference to specific examples thereof, it will be apparent to one skilled in the art that various changes and modifications can be made therein without departing from the spirit and scope thereof.

What is claimed is:

1. A fitment for package holding a liquid therein, said fitment being arranged for selectively dispensing an amount of the liquid from the package, the package comprising a flexible bag in which the liquid is located and having a planar wall portion bounding the liquid, said fitment being a metering dispensing valve having a body, a fluid inlet check valve, a fluid outlet check valve, a bulb, a piercing element and an outlet, said body comprising a planar flange arranged for securement to the planar wall portion of the bag, said bulb being compressible and defining a collapsible reservoir into which the amount of the liquid from the bag can be transferred for dispensing, said inlet check valve being arranged to isolate said reservoir from the bag, said outlet check valve being arranged to isolate said reservoir from said outlet, said inlet check valve being coupled to said bulb and arranged to close in response to a compression of said bulb and open in response to the release of said bulb, said outlet check valve being coupled to said bulb and arranged to open in response to the compression of said bulb and close in response to the release of said bulb, said piercing element comprising a movable tubular member coupled to said bulb and having a passageway therethrough in fluid communication with said inlet check valve, said piercing element being arranged to be moved with respect to the planar wall portion of the bag and pierce through the planar portion of the wall of the bag in response to the compression of said bulb, whereupon the amount of the liquid in the bag is drawn into said reservoir through said inlet check valve, said bulb also being arranged to be compressed after the amount of liquid is drawn into said reservoir to dispense the amount of the liquid through said outlet check valve to said outlet said fitment additionally comprising an inlet barrier and an outlet barrier, said inlet barrier being initially disposed over said inlet and said outlet barrier being initially disposed over said outlet, whereupon the interior of said fitment is initially sealed and isolated from the ambient atmosphere so that the interior of said fitment can be exposed to ionizing radiation to render its internal surfaces sterile, whereupon said fitment is ready to be secured to the wall of said bag.

2. The fitment of claim 1 wherein said inlet barrier comprises a thin membrane heat sealed over said inlet and arranged to be pierced by said piercing element.

3. The fitment of claim 1 wherein said inlet barrier comprises a thin membrane that is molded over said inlet and arranged to be pierced by said piercing element.

4. The fitment of claim 1 wherein said outlet barrier comprises a membrane releasably secured over said outlet.

5. An aseptic fitment for package holding a liquid therein, the package comprising a flexible bag having a wall, said a fitment being in the form of a metering valve comprising a body, an inlet, an inlet barrier, a fluid inlet check valve, a fluid outlet check valve, a compressible bulb, a piercing element, an outlet and an outlet barrier, said inlet barrier being disposed over said inlet and said outlet barrier being disposed over said outlet, whereupon the interior of said fitment is initially sealed and isolated from the ambient atmosphere, said fitment being arranged to be exposed to ionizing radiation to render its internal surfaces sterile and thereafter fixedly secured to the wall of the flexible bag for selectively dispensing a metered quantity of the liquid from the package, said outlet bather being arranged to be removed from said outlet, said compressible bulb defining a collapsible reservoir into which a portion of the liquid from the bag can be transferred for dispensing, said inlet valve being arranged to isolate said reservoir from the bag, said outlet valve being arranged to isolate said reservoir from said outlet, said piercing element being coupled to said compressible bulb, whereupon when said bulb is compressed it causes said piercing element to pierce through said inlet barrier and a portion of the wall of the bag, said valve being arranged when said bulb is thereafter released for automatically opening said inlet valve and closing said outlet valve, whereupon a metered amount of the liquid is drawn into said reservoir, said metering valve being further arranged so that when said bulb is compressed after the liquid is drawn into said reservoir said outlet valve is automatically opened to dispense the metered amount of the liquid through said outlet.

6. The fitment of claim 5 wherein said inlet bather comprises a thin membrane heat sealed over said inlet and arranged to be pierced by said piercing element.

7. The fitment of claim 5 wherein said inlet barrier comprises a thin membrane that is molded over said inlet and arranged to be pierced by said piercing element.

8. The fitment of claim 5 wherein said outlet barrier comprises a membrane releasably secured over said outlet.

9. A package for holding and selectively dispensing an amount of a liquid therefrom, said package comprising a flexible bag and a fitment, said bag having a hollow interior in which the liquid is located and a planar wall portion bounding the liquid, said fitment being a metering dispensing valve having a body, a fluid inlet check valve, a fluid outlet check valve, a bulb, a piercing element and an outlet, said body comprising a planar flange arranged for securement to the planar wall portion of the bag, said bulb being compressible and defining a collapsible reservoir into which the amount of the liquid from said bag can transferred for dispensing, said inlet check valve being arranged to isolate said reservoir from said bag, said outlet check valve being arranged to isolate said reservoir from said outlet, said inlet check valve being coupled to said bulb and arranged to close in response to a compression of said bulb and open in response to the release of said bulb, said outlet check valve being coupled to said bulb and arranged to open in response to the compression of said bulb and close in response to the release of said bulb, said piercing element comprising a movable tubular member coupled to said bulb and having a passageway therethrough in fluid communication with said inlet check valve, said piercing element being arranged to be moved with respect to said planar wall portion of said bag and pierce through the planar portion of said wall of said bag in response to the compression of said bulb, whereupon the amount of the liquid in said bag is drawn into said reservoir through said inlet check valve, said bulb also being arranged to be compressed after the amount of liquid is drawn into said reservoir to dispense the amount of the liquid through said outlet check valve to said outlet, said fitment additionally comprising an inlet barrier and an outlet barrier, said inlet barrier being initially disposed over said inlet and said outlet barrier being initially disposed over said outlet, whereupon the interior of said fitment is initially sealed and isolated from the ambient atmosphere so that the interior of said fitment can be exposed to ionizing radiation to render its internal surfaces sterile, whereupon said fitment is ready to be secured to said wall of said bag.

10. The package of claim 9 wherein said inlet barrier comprises a thin membrane heat sealed over said inlet and arranged to be pierced by said piercing element.

11. The package of claim 9 wherein said inlet barrier comprises a thin membrane that is molded over said inlet and arranged to be pierced by said piercing element.

12. The package of claim 9 wherein said outlet barrier comprises a membrane releasably secured over said outlet.

* * * * *